July 7, 1925.
E. H. ASHLOCK
1,545,027
CHIROPRACTIC ADJUSTMENT MACHINE
Filed Oct. 9, 1922
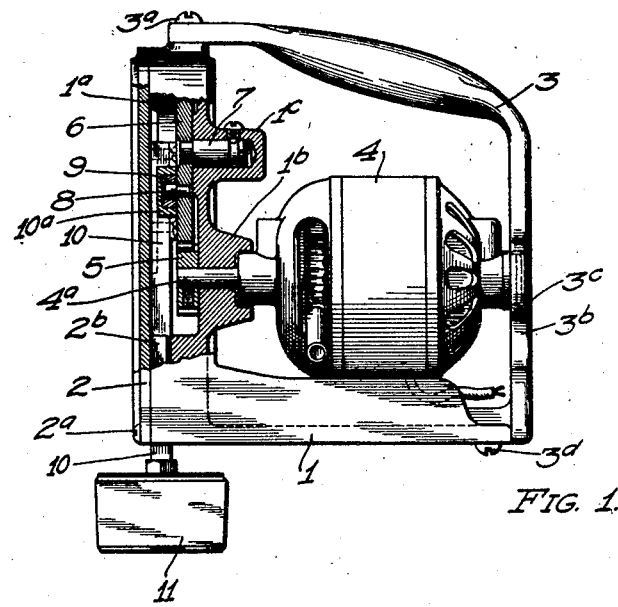
FIG. 1.
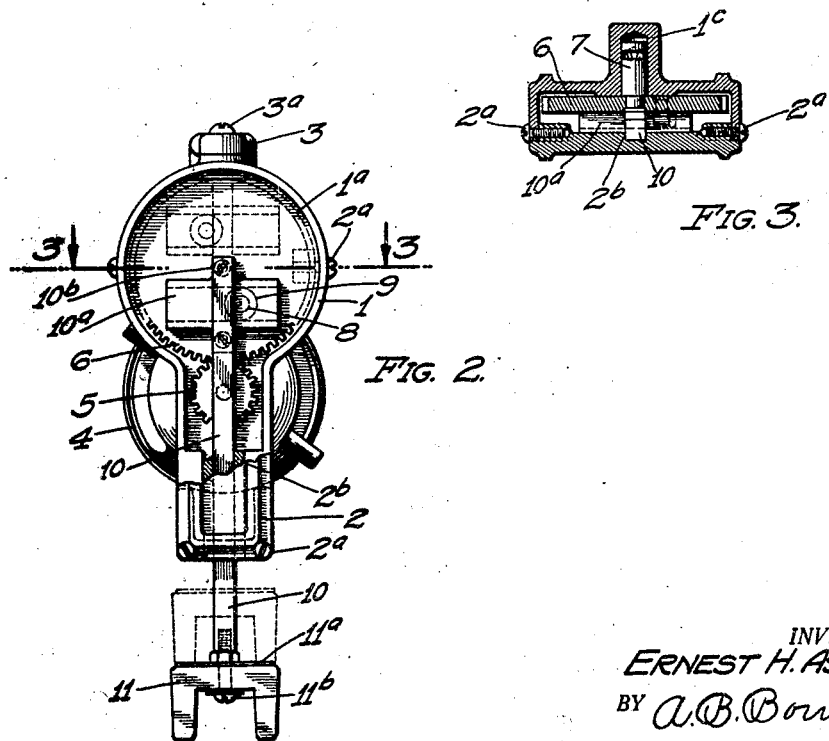
FIG. 2.
FIG. 3.
INVENTOR.
ERNEST H. ASHLOCK.
BY A. B. Bowman
ATTORNEY Patented July 7, 1925.

1,545,027

UNITED STATES PATENT OFFICE.

ERNEST H. ASHLOCK, OF SAN DIEGO, CALIFORNIA, ASSIGNOR OF ONE-FOURTH TO WILLIAM H. SWEETLAND AND ONE-FOURTH TO WALTER RITTENHOUSE, BOTH OF SAN DIEGO, CALIFORNIA.

CHIROPRACTIC ADJUSTMENT MACHINE.

Application filed October 9, 1922. Serial No. 593,443.

*To all whom it may concern:*

Be it known that I, ERNEST H. ASHLOCK, a citizen of the United States, residing at San Diego, in the county of San Diego and State of California, have invented certain new and useful Improvements in Chiropractic Adjustment Machines, of which the following is a specification.

My invention relates to a machine for preparing for and making chiropractic adjustments, and the principal object of my invention is improvements over my prior application for chiropractic adjustment machines filed June 8, 1921, Serial No. 475,874, and the object of these improvements are; first, to provide a machine of this class which is very simple and economical of construction; second, to provide a machine of this class, which is more positive in its action; third, to provide a machine of this class of novel construction; fourth, to provide a machine of this class which is more easily handled upon the body of the patient, and fifth, to provide a machine of this class which is very simple, compact, light, durable and efficient.

With these and other objects in view as will appear hereinafter, my invention consists of certain novel features of construction, combination and arrangement of parts and portions, as will be hereinafter described in detail, and particularly set forth in the appended claims, reference being had to the accompanying drawings, and to the characters of reference thereon, which form a part of this application, in which:

Figure 1 is a side elevational view of my machine, showing parts and portions broken away and in section to facilitate the illustration; Fig. 2 is an end elevational view thereof, showing parts and portions broken away and in section to facilitate the illustration and showing by dotted lines varying positions of the plunger and its connecting members, and Fig. 3 is a transverse sectional view through 3—3 of Fig. 2 showing some of the parts in plan.

Similar characters of reference refer to similar parts and portions thoughout the several views of the drawings.

The casing member 1, cover member 2, handle member 3, motor 4, pinion 5, gear 6, shaft 7, pin 8, roller 9, plunger member 10, and contact member 11, constitute the principal parts and portions of my chiropractic adjustment machine.

The casing 1, is L shaped as shown best in the drawing and is provided with a hollow portion 1ª, adapted for the pinion 5, gear 6, and plunger member 10, to operate therein, and is provided with a cover member 2 secured over the open space thereof by means of screws 2ª. This cover member 2 is provided with inwardly extending guide ledges 2ᵇ adapted to serve as guides for guiding the plunger 10 and retaining it in certain relative position while reciprocating therein. Secured to the upper side of the casing 1 by means of the screw 3ª is a handle member 3, which is preferably positioned on an angle as shown best in Fig. 1 of the drawings. It is provided with a normally vertical portion 3ᵇ, which is provided with a recess therein, in which is mounted a bushing 3ᶜ which serves as a support for one end of the motor 4. This handle member 3 is secured to the lower base portion of the casing 1 by means of a screw 3ᵈ. The other end of the motor is supported in a boss 1ᵇ on the casing 1. The motor 4 is supported in torque by resting against the upwardly extending edges of the channel portion of the casing 1, shown best in Fig. 2 of the drawing. The shaft 4ª of the motor 4 extends through into the interior or hollow portion 1ª of the casing 1. On the extended end of this shaft 4ª is secured a spur pinion 5 which meshes with a spur gear 6, which is mounted on a shaft 7, which shaft 7 is revolubly mounted in a hollow boss 1ᶜ in the casing 1. This gear 6 is a crank wheel provided with a pin 8 with an extended end upon which is revolubly mounted a roller 9. This roller 9 is reciprocally mounted in the cross head portion 10ª of the plunger 10. It will be noted that the cross head portion 10ª is secured to the plunger member 10 by means of screws 10ᵇ, however it is obvious that this cross head member 10ª may be an integral portion of the plunger member if desired.

Secured on the outwardly extended end of the plunger 10 is a contact member 11, which consists of a channel shaped piece of rubber with the members extending outwardly as shown best in Figs. 1 and 2 of the drawings. It is provided on the back with a metallic plate 11ª for reinforcing the same and secured to said plunger member by means of a bolt 11ᵇ.

Though I have shown and described a particular construction, combination and arrangement of parts and portions, I do not wish to be limited to this particular construction, combination and arrangement but desire to include in the scope of my invention, the construction, combination and arrangement substantially as set forth in the appended claims.

It is obvious that with this construction there is provided a chiropractic adjustment machine which is very simple and economical of construction; that the motor 4 will turn the pinion 5, which in turn will revolve the gear 6, and the roller 9, mounted on the gear 6, will reciprocate in the cross head 10ª with the revolution of the gear 6, carrying with it the plunger 10, thus providing a reciprocating motion to the contact member 11, that the plunger 10 is guided by means of guides extending from the cover member 2 which confines it in its relative operating position, thus providing a positive, durable machine of this class.

Having thus described my invention, what I claim as new and desire to secure by Letters Patent, is:

1. A device of the class described, including a supporting casing, a motor mounted on said casing, a pinion secured to the shaft of said motor, a gear meshing with said pinion and provided with a roller revolubly mounted on one side of said gear, and a plunger member reciprocally mounted in said casing and provided with a transversely slotted cross head, said roller engaging said cross head in the transverse slot thereof.

2. A device of the class described, including a supporting casing, a motor mounted on said casing, a pinion secured to the shaft of said motor, a gear meshing with said pinion and provided with a roller revolubly mounted on the side of said gear, a plunger member reciprocally mounted in said casing and provided with a transversely slotted cross head, said roller engaging said cross head in the transverse slot thereof, and longitudinal guide means in said casing for supporting said plunger and cross head relatively to said casing while reciprocating.

3. A device of the class described, including a supporting casing, a motor mounted on said casing, gear means provided with a roller revolubly mounted thereon in said casing, a plunger member reciprocally mounted in said casing and provided with a slotted cross head, said roller engaging said cross head in the transverse slot thereof, and a resilient contact member secured on the extended end of said plunger member.

4. A device of the class described, including a supporting casing, a motor mounted on said casing, a pinion secured to the shaft of said motor, a gear meshing with said pinion and provided with a roller revolubly mounted on the side of said gear, a plunger member reciprocally mounted in said casing and provided with a transversely positioned and slotted cross head positively engaging said roller, guide means in said casing for supporting said plunger and cross head relatively to said casing while reciprocating, and a resilient contact member secured on the extended end of said plunger.

5. A device of the class described, including an L shaped supporting casing, a handle connecting the extended ends of said casing, a motor supported between said casing and said handle member, a plunger reciprocally mounted in said casing, means connecting said plunger with the motor shaft, whereby said plunger is reciprocated with the operation of said motor, including a cross head at one end of said plunger, a crank wheel having a roller engaging with said cross head, and a pinion connecting with said crank wheel and secured to the shaft of said motor.

In testimony whereof I have hereunto set my hand at San Diego, California, this 29th day of September, 1922.

ERNEST H. ASHLOCK.